United States Patent [19]

Aoki

[11] Patent Number: 4,920,246
[45] Date of Patent: Apr. 24, 1990

[54] HIGH FREQUENCY HEATING APPARATUS USING MICROCOMPUTER CONTROLLED INVERTER

[75] Inventor: Masayuki Aoki, Ichinomiya, Japan

[73] Assignee: Kabushiki Kaisha Toshiba, Kawasaki, Japan

[21] Appl. No.: 326,682

[22] Filed: Mar. 21, 1989

[30] Foreign Application Priority Data

Mar. 28, 1988 [JP] Japan .................................. 63-73793

[51] Int. Cl.⁵ .............................................. H05B 6/68
[52] U.S. Cl. .......................... 219/10.55 B; 219/10.77; 363/98; 323/283
[58] Field of Search ....................... 219/10.55 B, 10.77, 219/490, 492; 363/96, 97, 98, 131, 132; 323/283

[56] References Cited

U.S. PATENT DOCUMENTS

| | | | |
|---|---|---|---|
| 4,002,875 | 1/1977 | Kiuchi et al. | 219/10.55 B |
| 4,453,068 | 6/1984 | Tucker et al. | 363/96 X |
| 4,507,531 | 3/1985 | Teich et al. | 219/10.55 B |
| 4,686,340 | 8/1987 | Fukasawa | 219/10.77 |
| 4,701,588 | 10/1987 | Fukasawa | 363/97 X |
| 4,724,291 | 2/1988 | Inumada | 219/10.55 B |
| 4,777,575 | 10/1988 | Yamato et al. | 219/10.55 B X |
| 4,825,028 | 4/1989 | Smith | 363/98 X |

FOREIGN PATENT DOCUMENTS

| | | |
|---|---|---|
| 0136855A2 | 4/1985 | European Pat. Off. |
| 57-10076 | 2/1982 | Japan |
| 1542662 | 3/1979 | United Kingdom |
| 2166916A | 5/1986 | United Kingdom |

Primary Examiner—Philip H. Leung
Attorney, Agent, or Firm—Cushman, Darby & Cushman

[57] ABSTRACT

A high frequency heating source provides a predetermined high frequency heating output. An inverter receives an AC input and provides a high frequency output for driving the high frequency heating source. The inverter includes a rectifier for rectifying the AC input and a switching element for switching a DC output from the rectifier. The microprocessor outputs an ON/-OFF signal having predetermined ON and OFF periods in accordance with a set output value associated with the high frequency heating output. A driver drives the switching element of the inverter in accordance with the ON/OFF signal output from the microprocessor.

9 Claims, 3 Drawing Sheets

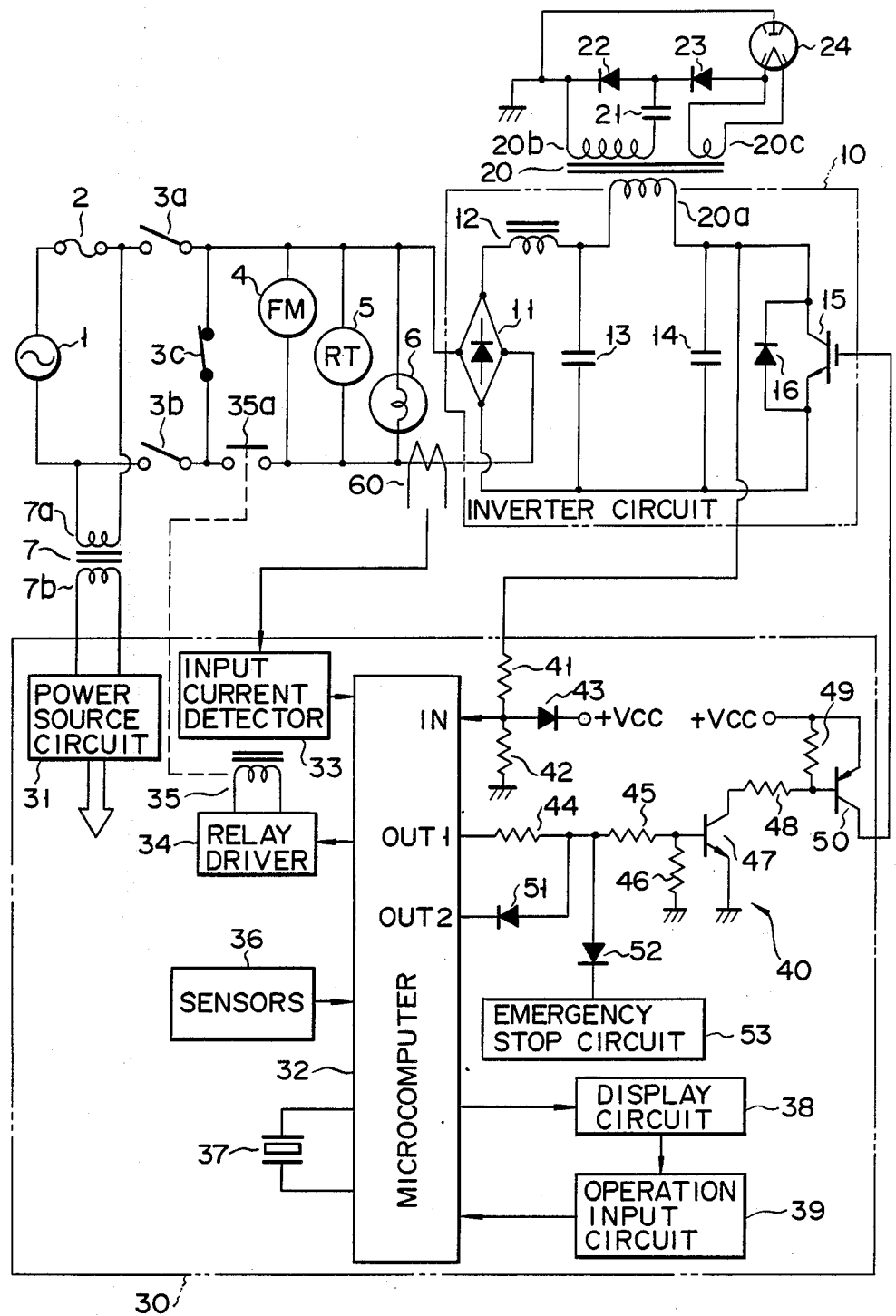
F I G. 1

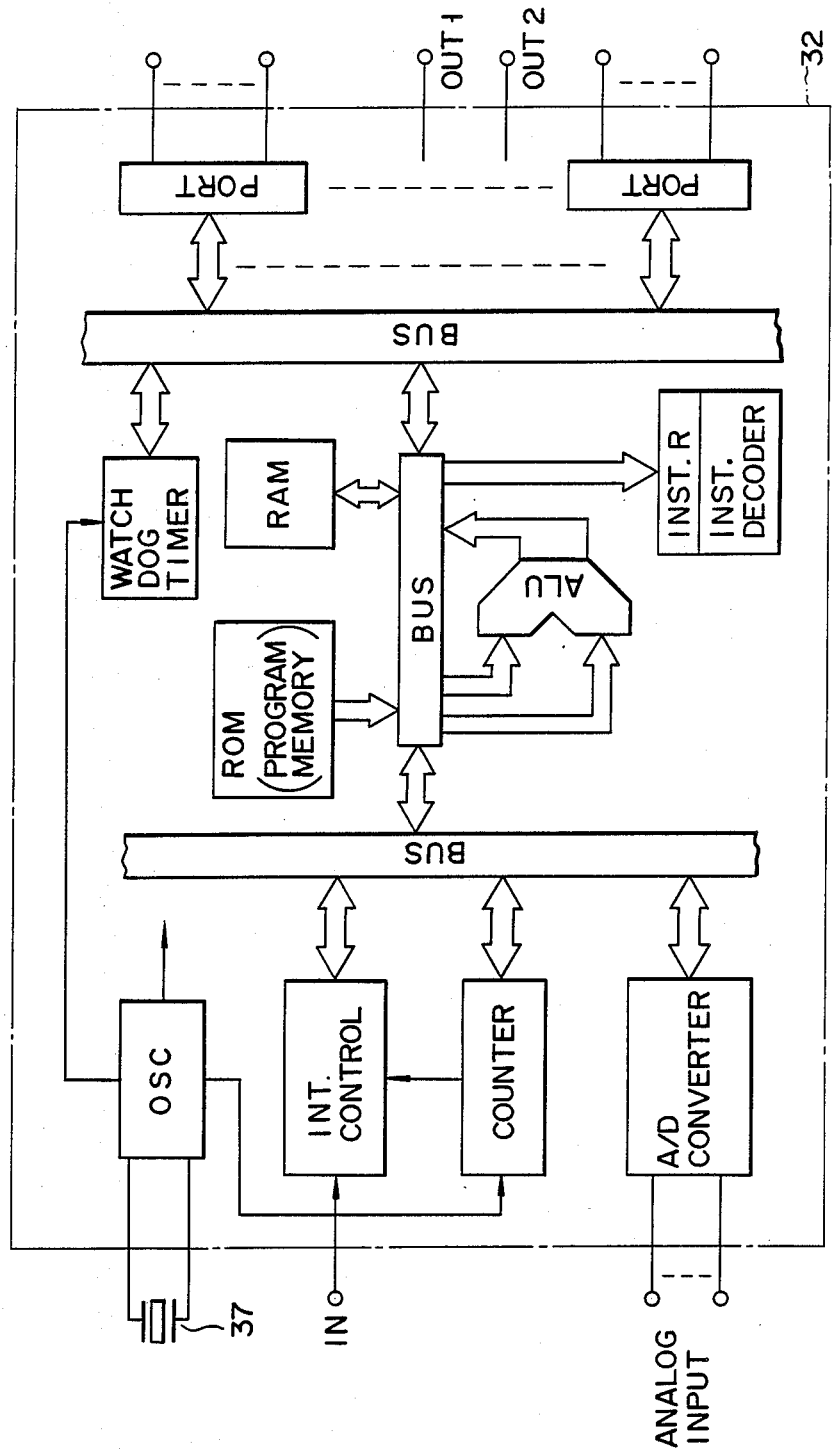
F I G. 2

4,920,246

HIGH FREQUENCY HEATING APPARATUS USING MICROCOMPUTER CONTROLLED INVERTER

BACKGROUND OF THE INVENTION

1. Field of the Invention

This invention relates to a high frequency heating apparatus using a microcomputer controlled inverter and, more particularly, to a high frequency heating apparatus which can be suitably applied to a microwave oven or an electromagnetic cooking device using high frequency heating.

2. Description of the Related Art

Recently, a cooking device using an inverter for driving power supply has been known as a typical example of cooking devices using high frequency heating, e.g., microwave ovens using a magnetron as a heating source.

More specifically, such a microwave oven employs an inverter which enables the oven to continuously adjust a heating output. In addition, by using a high frequency driving power source, a high-voltage transformer and a high-voltage capacitor for driving a magnetron can be reduced in weight and size.

In spite of the above-described advantages, a microwave oven using such an inverter has a complicated arrangement, and hence the cost is inevitably increased due to the following reason.

In a conventional technique, in order to perform switching of the inverter, this microwave oven requires, for example, (1) an oscillator for generating a sawtooth signal, (2) a pulse width modulator (PWM) for PWM-modulating an output from the oscillator by using an output setting signal, and (3) a driver for ON/OFF-driving a switching element of the inverter in accordance with an output from the pulse width modulator.

SUMMARY OF THE INVENTION

It is, therefore, an object of the present invention to provide a new and improved high frequency heating apparatus using a microcomputer controlled inverter which has a simple arrangement and can reduce the cost.

According to the present invention, there is provided a high frequency heating apparatus comprising:

a high frequency heating source for providing a predetermined high frequency heating output;

inverter means for receiving an AC input and providing a high frequency output for driving the high frequency heating source, the inverter means including rectifying means for rectifying the AC input and a switching element for switching a DC output from the rectifying means;

microprocessing means for outputting an ON/OFF signal having predetermined ON and OFF periods in accordance with a set output value associated with the high frequency heating output; and driving means for driving the switching element of the inverter means in accordance with the ON/OFF signal output from the microprocessing means.

BRIEF DESCRIPTION OF THE DRAWINGS

These and other objects and features of the present invention can be understood through the following embodiment by reference to the accompanying drawings, in which:

FIG. 1 is a circuit diagram showing an arrangement of an electrical circuit according to an embodiment of the present invention;

FIG. 2 is a block diagram showing an internal arrangement of a main part of a microcomputer in FIG. 1.

DETAILED DESCRIPTION OF THE PREFERRED EMBODIMENT

Figure 3:
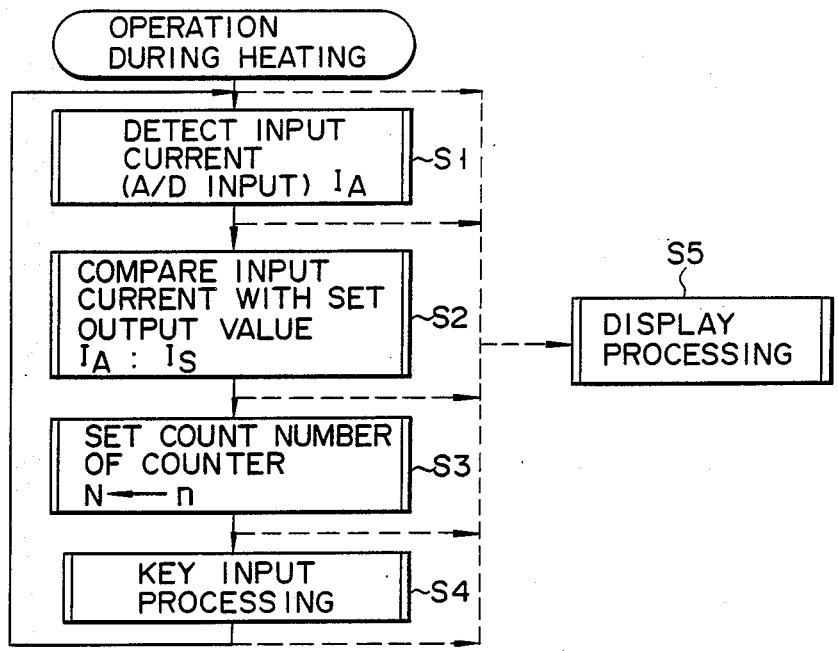
FIGS. 3 and 4 are flow charts for explaining an operation of the circuit in FIG. 1.

A microwave oven according to an embodiment of the present invention will be described below with reference to the accompanying drawings.

Referring to FIG. 1 showing a control circuit of the microwave oven, reference numeral 1 denotes an commercial AC power source to which a door monitor switch (short switch) 3c is connected through a fuse 2 and door switches 3a and 3b. In addition, a fan motor 4 for cooling a magnetron is connected to the power source 1 through the fuse 2, the door switch 3a, a relay contact 35a, and the door switch 3b. A turntable driving motor 5 and a heating chamber illuminating lamp (internal lamp) 6 are connected in parallel to the fan motor 4. An inverter 10 is connected to the power source 1 through the fuse 2, the door switch 3a, the relay contact 35a, and the door switch 3b.

The inverter 10 comprises a rectifier constituted by a diode bridge 11, a choke coil 12, and a smoothing capacitor 13. One terminal of a primary coil 20a of a high-voltage transformer 20 is connected to the output terminal of the rectifier. The other terminal of the primary coil 20 of the high-voltage transformer 20 is connected to one terminal of a resonance capacitor 14. The other terminal of the capacitor 14 is connected to the other terminal of the rectifier.

The collector-emitter path of a switching transistor 15 constituted by an NPN insulation gate bipolar transistor (IGBT) as a switching element and a damper diode (flywheel) 16 are connected in parallel to the resonance capacitor 14. Note that the switching transistor 15 and the damper diode 16 are integrally packaged.

The switching transistor 15 can be controlled by a voltage. The resonance circuit is excited by ON/OFF-controlling the switching transistor 15, so that a high frequency current flows through the primary coil 20.

A high frequency oscillator serving as a heating operation section is connected to secondary coils 20b and 20c of the high-voltage transformer 20. The high frequency oscillator is connected to the anode-cathode path of a magnetron 24 through a voltage doubler rectifier constituted by the secondary coil 20b of the high-voltage transformer 20, a high-voltage capacitor 21, and high-voltage diodes 22 and 23. The anode of the magnetron 24 is grounded, and its heater (cathode) is connected to the secondary coil 20c of the transformer 20.

A primary coil 7a of a step-down transformer 7 is connected to the power source 1 through the fuse 2. A control section 30 is connected to a secondary coil 7b of the step-down transformer 7.

The control section 30 entirely controls the cooking device, and comprises a power source circuit 31, a microcomputer 32, an input current detector 33, a relay driver 34, a relay 35, sensors 36, an oscillating element 37 for generating a reference clock signal, a display circuit 38, and an operation input circuit 39 for setting an output and a time associated with cooking and for staring an operation.

The microcomputer 32 serves as a main control section, and has a function for generating a switching ON/OFF signal to the inverter 10 through a driver 40 (to be described later). a function for determining a timing at which an ON/OFF signal is generated in accordance with an output from a switching transistor 15 of the inverter 10, a function for adjusting the ON period of the switching ON/OFF switching signal in accordance with a current input to the inverter 10, a function as a watch dog timer, a function for stopping a switching operation of the inverter 10 upon abnormality detection by the watch dog timer, and the like.

The input current detector 33 detects a current input to the inverter 20 in accordance with an output from a current transformer 60 (to be described later), and supplied a detection result to the microcomputer 32.

The relay driver 34 drives the relay 35 in response to a command from the microcomputer 32.

The sensors 36 are constituted by various sensors, such as temperature and humidity sensors, for detecting a cooking state, and supply detection results to the microcomputer 32.

A series circuit of resistors 42 and 42 is arranged in the control section 30, so that a collector voltage of the switching transistor 15 in the inverter 10 is fetched in the series circuit. A voltage across the resistor 42 is applied to an input port IN of the microcomputer 32. Note that a protective diode 43 is connected to the resistor 42.

In the Control section 30, a series circuit of resistors 44, 45, and 46 is connected between ground and an output port OUT1 of the microcomputer 32. The base-emitter path of an NPN transistor 47 is connected to the node of the resistors 45 and 46.

The collector of the transistor 47 is connected to a DC power source terminal +VCC through resistors 48 and 49, and the emitter-base path of a PNP transistor 50 is connected to the resistor 49.

The base of the switching transistor 15 of the inverter 10 is connected to the collector of the transistor 50.

That is, the above-described components from the resistor 44 to the transistor 50 constitute the driver 40 for ON/OFF-driving the switching transistor 15 of the inverter 10 in accordance with an ON/OFF signal generated by the microcomputer 32.

In addition, the anode of a diode 51 is connected to a node between the resistors 44 and 45, and the cathode of the diode 51 is connected to an output port OUT2 of the microcomputer 32.

The anode of the diode 52 is connected to a node between the resistors 44 and 45, and the cathode of the diode 52 is connected to an emergency stop circuit 53.

As FIG. 2 shows an internal arrangement of a main portion of the microcomputer 32, for example, it comprises an oscillator (OSC), an interrupt control circuit (INT. CONTROL), a counter (COUNTER), an analog/digital converter (A/D CONVERTER), an arithmetic and logic unit (ALU), a read-only memory (ROM) as a program memory, a random access memory (RAM), an instruction register (INST.R), an instruction decoder (INST. DECODER), a watch dog timer (WATCH DOG TIMER), and a plurality of ports (PORTs) and internal buses (BUSes). Reference symbols IN, OUT1, and OUT2 in FIG. 2 correspond to those of the microcomputer 32 in FIG. 1. Note that a microcomputer capable of high-speed processing and having various functions, such as a μPD78C-series (available from NEC CORP.) may be used as the microcomputer 32.

The OSC generates various clock and timing signals in accordance with the (quartz) oscillating element 37 which is externally connected thereto in the same manner as described in FIG. 1. Reference clock signals from the OSC are supplied to the COUNTER. An output from the COUNTER is supplied to the INT. CONTROL together with a signal from the input port IN corresponding to the input terminal IN of the microcomputer 32 in FIG. 1. Analog signals from the input current detector 33 and the sensors 36 are supplied to the A/D CONVERTER.

The current transformer 60 is arranged on an input line to the inverter 30.

An operation in the above-described arrangement will be described below.

A desired cooking time and a heating output are set and a cooking start operation is performed through the operation input circuit 39.

Subsequently, the microcomputer 32 operates the relay 35. When the relay 35 is operated, the contact 35a is ON so as to form a conducting path to the inverter 10.

In addition, the microcomputer 32 generates an ON/OFF signal from the output port OUT1 in accordance with processing during a heating operation and interrupt processing (to be described later).

When the ON/OFF signal is generated, the NPN transistor 47 is ON/OFF-operated, and the pnp transistor 50 is ON/OFF-operated upon the ON/OFF operation of the transistor 47.

When the PNP transistor 50 is turned on, the switching transistor 15 (to be described later) is turned on. As a result, a current flows in the primary coil 20a of the high-voltage transformer 20 through the collector-emitter path of the switching transistor 15. When the PNP transistor 50 is turned off, the switching transistor 15 is turned off, the current which has flown in the primary coil 20a of the transformer 20 charges the resonance capacitor 14. A current then flows from the resonance capacitor 14 to the primary coil 20a of the transformer 20.

In this manner, a high frequency current flows in the primary coil 20a of the high-voltage transformer 20 upon ON/OFF operation of the switching transistor 15. As a result, the magnetron 24 connected to the secondary coil 20b of the transformer 20 performs oscillation having a microwave band.

That is, a high frequency wave is radiated in the heating chamber (not shown) and cooking by dielectric heating is started.

As described above, the ON/OFF signal for switching the inverter 10 through the driver 40 is directly obtained from the microcomputer 32. Therefore, an oscillator for generating a sawtooth signal, a pulse width modulator, and the like as in the conventional technique are not required. That is, a simple arrangement can be realized and the cost of the overall cooking device can be reduced.

With the above-described arrangement, the microcomputer 32 fetches a collector voltage appearing at the switching transistor 15, and performs interrupt processing for matching the ON timing of an ON/OFF signal with a timing at which the fetched voltage becomes the lowest voltage (e.g., a zero potential).

With this operation, the switching transistor 15 is turned on while its collector voltage is set at a lowest voltage, thereby minimizing a loss due to a switching operation of the switching transistor 15.

The microcomputer 32 performs processing during a heating operation as follows. The microcomputer 32 fetches a detection result (a current input to the inverter 10) from the current detector 33. If the detection result is smaller than a set value (corresponding to a set heating output), the microcomputer 32 prolongs the ON period of an ON/OFF signal so as to prolong the ON period of the switching transistor 15.

On the contrary, if the detection result is larger than the set value, the microcomputer 32 shortens the ON period of the ON/OFF signal so as to shorten the ON period of the transistor 15.

If the ON period of the switching transistor 15 is prolonged by this operation, a current flowing through the primary coil 20 of the high-voltage transformer 20 is increased, and hence a heating output from the inverter 20 is increased. If the ON period is shortened, the current flowing through the primary coil 20 of the transformer 20 is decreased, and hence the heating output from the inverter 10 is decreased.

With such processing during a heating operation by the microcomputer 32, a heating output from the inverter 10 can be maintained at a set heating output, and reliable, proper adjustment of a heating output can always be performed.

The microcomputer 32 has a watch dog timer function. If abnormality of a program, such as an overrun error, is detected by the watch dog timer function, the output port OUT2 is set at logic "0".

When the output port OUT2 is set at logic "0", an ON/OFF signal from the output port OUT1 is bypass-filtered, and the transistors 47 and 50 of the driver 40 are turned off. As a result, an ON/OFF operation of the switching transistor 15, i.e., a switching operation of the inverter 10, is stopped.

In this manner, if a control error occurs in the microcomputer 32, it is immediately detected to stop a heating operation in this manner, thus ensuring sufficient overall safety in the microwave oven.

In addition, if any emergence occurs due to an incidental, undesired condition caused during heating by the microwave oven, a stop operation may be performed through the emergency stop circuit 53.

When a stop operation is performed, an output from the emergency stop circuit 53 is set at logic "0", and an ON/OFF signal from the output port OUT1 is bypass-filtered. As a result, a switching operation of the inverter 10 is stopped through the driver 40.

Since a heating operation can be quickly stopped as needed, e.g., in an emergency, in this manner, the microwave oven of the present invention is safe and convenient.

FIG. 3 is a flow chart showing processing by the microcomputer 32 described above during heating. More specifically, in step S1, the microcomputer 32 detects an input (current) value IA from the input current detector 33 as an A/D-converted input. In step S2, microcomputer 32 compares the input value IA with a set output value IS. In step S3, the microcomputer 32 sets a count number n calculated on the basis of a comparison result in step S2 in the internal counter. With this operation, the internal counter starts counting a reference clock signal number N in an interrupt routine (to be described later). The microcomputer 32 sets the ON period of the ON/OFF signal until condition N=n is satisfied. In step S4, the flow returns to step S1 upon key input processing. Note that during this period, the microcomputer 32 properly performs display processing shown in step S5 by an internal interrupt operation.

Figure 4:
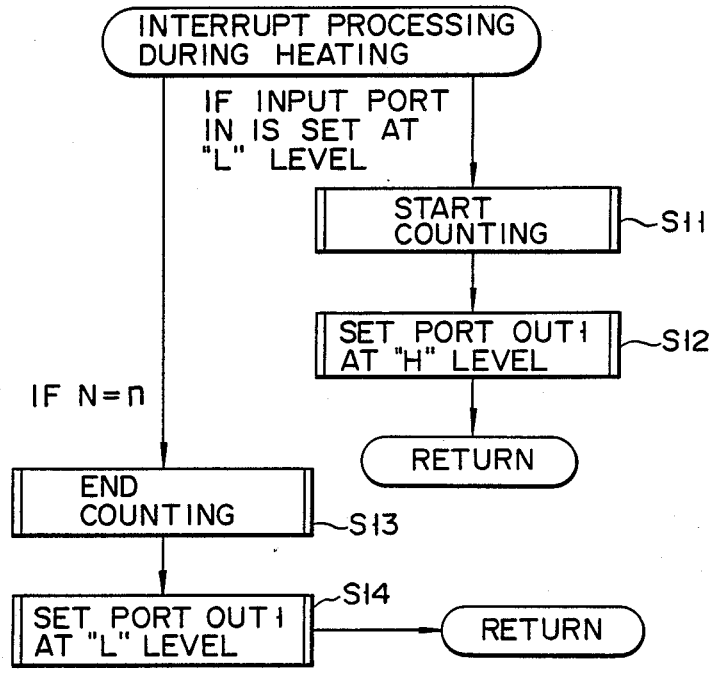

FIG. 4 is a flow chart showing interrupt processing during the heating operation described above. More specifically, when the input port IN is set at "L" level, the flow of operation is shifted from the routine shown in FIG. 3 to the routine shown in FIG. 4, and this interrupt routine processing is performed as follows. In step S11, the microcomputer 32 automatically causes the internal counter to start counting. In step S12, the output port OUT1 is set at "H" level, and the flow returns to the routine in FIG. 3. If N=n in step S13, and counting of the set count number is completed, the next interrupt processing is performed. That is, the microcomputer 32 sets the output port OUT1 at "L" level in step S14, and the flow returns to the routine in FIG. 3.

As described above, since the switching transistor 15 which can be controlled by a voltage is employed as a switching element of the inverter 10, driving power for switching can be reduced.

In contrast to this, in the conventional technique, a high-speed, high-power transistor is generally employed as a switching element. However, since the power transistor has a large base current, power consumption in a driver is increased. In addition, a reverse current must flow through the base to realize a high-speed operation, and hence the driver is inevitably complicated. In the present invention, an IGBT is employed as the switching transistor 15 as described above, so that a simple, low-power-consumption type driver such as the driver 40 arranged in the control section 30 can be used. This also leads to a reduction in capacity of the power source circuit 31 in the control section 30.

When a set cooking time has elapsed, the microcomputer 32 stops an operation of the relay 35. When the operation of the relay 35 is stopped, the contact 35a is disconnected, and the conducting path to the inverter 10 is disconnected.

In the above-described embodiment, the microwave oven using a high frequency oscillator as its heating operation section has been described. However, the present invention can be applied to an electromagnetic cooking device using a heating coil as its heating operation section.

The present invention is not limited to the above-described embodiment, and various changes and modifications can be made within the spirit and scope of the invention.

As has been described above, the high frequency heating apparatus of the present invention comprises a heating operation section, an inverter for rectifying an AC power source voltage, converting it into an AC current by switching operation, and supplying it to the heating operation section, a microcomputer for generating an ON/OFF signal for switching the inverter, and a driving means for ON/OFF-driving a switching element of the inverter in accordance with the ON/OFF signal output from the microcomputer. With this arrangement, the overall arrangement of the high frequency heating apparatus can be simplified, and hence the cost can be reduced.

In addition, since the present invention employs a microcomputer for determining the ON timing of an ON/OFF signal in accordance with a voltage applied to the switching element of the inverter, a loss due to switching can be minimized.

Since the present invention employs a microcomputer for determining the ON period of an ON/OFF signal in accordance with a current input to the inverter, reliable and proper adjustment of a heating output can be performed.

The microcomputer comprises a watch dog timer and a means for stopping a switching operation of the inverter upon abnormality detection by the watch dog timer. Therefore, safety with respect to control abnormality can be satisfactorily ensured.

Since an emergency stop circuit for stopping a switching operation of the inverter is employed, a heating operation can be immediately stopped in an emergency.

A transistor which can be controlled by a voltage is employed as a switching element of the inverter. Therefore, driving power for a switching operation of the inverter can be reduced.

What is claimed is:

1. A high frequency heating apparatus comprising:
   a high frequency heating source for providing a predetermined high frequency heating output;
   inverter means for receiving an AC input and providing a high frequency output for driving said high frequency heating source, said inverter means including rectifying means for rectifying the AC input and a switching element for switching a DC output from said rectifying means;
   voltage detecting means for detecting an output voltage value from said switching element of said inverter means;
   microprocessing means for outputting an ON/OFF signal with generation timing determined by interrupt processing in accordance with output voltage value detected by said voltage detecting means, said microprocessing means including:
   (a) generating means for generating a reference clock;
   (b) counter means for counting reference clocks generated by said generating means in accordance with a set output value associated with the high frequency heating output;
   (c) ON/OFF signal generating means for outputting the ON/OFF signal having the ON and OFF periods corresponding to a count result of said counter means;
   driving means for driving said switching element of said inverter means in accordance with the ON/OFF signal output from said microprocessing means.

2. An apparatus according to claim 1, wherein the detected output voltage value includes a substantially zero potential.

3. An apparatus according to claim 1, wherein said apparatus further comprises input detecting means for detecting the AC input value supplied to said inverter means, and said microprocessing means controls an ON period of the ON/OFF signal in accordance with an AC input value detected by said input detecting means.

4. An apparatus according to claim 1, wherein said microprocessing means further comprises watch dog timer means for detecting abnormality of said microprocessing means; and
   switching stop signal generating means for outputting a signal for stopping a switching operation of said inverter means to said driving means in accordance with abnormality detection by said watch dog timer means.

5. An apparatus according to claim 1, wherein said apparatus further comprises emergency stop means for providing a signal for stopping a switching operation of said inverter means to said driving means in accordance with a stop operation in an emergency due to an undesired condition during heating by said apparatus.

6. An apparatus according to claim 1, wherein said switching element of said inverter means includes a transistor which can be controlled by a voltage.

7. An apparatus according to claim 6, wherein said transistor comprises an insulation gate bipolar transistor.

8. An apparatus according to claim 1, wherein said high frequency heating source includes a magnetron.

9. An apparatus according to claim 8, wherein said magnetron is connected to said inverter means through a high-voltage transformer and a rectifier.

* * * * *